US009333976B2

(12) United States Patent
Kahrger et al.

(10) Patent No.: US 9,333,976 B2
(45) Date of Patent: May 10, 2016

(54) SERVICE VEHICLE FOR REPLACING IDLERS OF A BELT CONVEYOR

(71) Applicant: TAKRAF GmbH, Leipzig (DE)

(72) Inventors: Rainer Kahrger, Leipzig (DE); Mario Dilefeld, Leipzig (DE); Steffen Vollrath, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 107 days.

(21) Appl. No.: 14/445,557

(22) Filed: Jul. 29, 2014

(65) Prior Publication Data
US 2015/0033977 A1 Feb. 5, 2015

(30) Foreign Application Priority Data

Jul. 30, 2013 (DE) .......................... 10 2013 214 913

(51) Int. Cl.
*B65G 39/00* (2006.01)
*B61B 13/00* (2006.01)
*B65G 15/00* (2006.01)

(52) U.S. Cl.
CPC .............. *B61B 13/00* (2013.01); *B65G 15/00* (2013.01); *B65G 39/00* (2013.01)

(58) Field of Classification Search
CPC ........ B65G 39/00; B65G 39/02; B65G 39/10; B65G 39/12; B65G 15/00; B65G 43/00; B65G 21/06; B66F 11/00
See application file for complete search history.

(56) References Cited

U.S. PATENT DOCUMENTS

| | | | | | |
|---|---|---|---|---|---|
| 3,575,274 | A | * | 4/1971 | Ewing .................... | B65G 15/00 104/118 |
| 3,614,823 | A | * | 10/1971 | Weber et al. ........... | B65G 15/00 198/827 |
| 4,326,601 | A | * | 4/1982 | Grove .................... | B66F 17/006 116/298 |
| 4,674,168 | A | * | 6/1987 | Bittner .................. | B23D 35/008 241/82 |
| 2008/0060909 | A1 | * | 3/2008 | DeVries ................. | B65G 15/00 198/300 |
| 2010/0224845 | A1 | * | 9/2010 | Dowling ............... | B65G 15/62 254/93 HP |
| 2014/0283351 | A1 | * | 9/2014 | Kahrger ................. | B65G 21/10 29/402.08 |
| 2015/0033977 | A1 | * | 2/2015 | Kahrger ................. | B65G 39/00 104/306 |
| 2015/0082596 | A1 | * | 3/2015 | Carter .................... | B65G 15/00 29/402.08 |

FOREIGN PATENT DOCUMENTS

| | | |
|---|---|---|
| DE | 3 42 000 C | 10/1921 |
| DE | 38 147 A | 11/1964 |
| DE | 19 54 363 A1 | 5/1970 |
| DE | 7 238 731 U | 4/1973 |
| DE | 17 56 158 C3 | 1/1976 |
| DE | 1 48 504 A1 | 5/1981 |

(Continued)

*Primary Examiner* — Jason C Smith
(74) *Attorney, Agent, or Firm* — McGlew and Tuttle, P.C.

(57) ABSTRACT

A track displaceable service vehicle replaces individual worn or damaged idlers with new idlers in the upper run and lower run of a belt conveyor with rising or falling conveying route, in which there is little space for the use of the service vehicle for replacing the idlers. The service vehicle accommodates a magazine for new and worn idlers and auxiliary devices for lifting the belt and removing old and for installing new idlers. A platform carries service personnel, and can be brought into a horizontal position in case of an inclined travel route of the service vehicle. The replacing of worn or defective idlers takes place in certain cycles in which the entire segment of the belt conveyor is removed and all worn and defective idlers are replaced. The service vehicle has a drive and is suitable for long tunnel sections (conveying routes which extend over several kilometers).

6 Claims, 3 Drawing Sheets

(56) References Cited

FOREIGN PATENT DOCUMENTS

| DE | 229 662 | A1 | 11/1985 |
| DE | 287 919 | A5 | 3/1991 |
| DE | 31 19 935 | C2 | 7/1992 |

* cited by examiner

SERVICE VEHICLE FOR REPLACING IDLERS OF A BELT CONVEYOR

CROSS REFERENCE TO RELATED APPLICATIONS

This application claims the benefit of priority under 35 U.S.C. § 119 of German Patent Application DE 10 2013 214 913.1 filed Jul. 30, 2013, the entire contents of which are incorporated herein by reference.

FIELD OF THE INVENTION

The present invention pertains to a service vehicle displaceable on tracks for replacing individual worn or damaged idlers with new idlers in the upper run and in the lower run of a belt conveyor with rising or falling conveying route, in which there is little space for the use of the service vehicle for replacing the idlers. Such a service vehicle accommodates auxiliary devices for lifting the belt and for removing old idlers and installing new idlers. The replacing of worn or defective idlers takes place in certain cycles, whereby in each cycle the entire segment of the belt conveyor is removed and all worn and defective idlers are replaced. This service vehicle has its own drive and is particularly suitable for use in long tunnel sections. Here, long tunnel sections are defined as conveying routes, which extend over several kilometers.

BACKGROUND OF THE INVENTION

In conveyor belt units with large belt widths and high conveying speeds, individual idlers, because of their dead weight, can no longer be replaced by hand in case of needed repairs.

Auxiliary devices, which are displaceable along the conveying route either next to the belt conveyor, on the belt conveyor or enclosing the belt conveyor in a gate-like manner, are used for replacing worn or damaged idlers. Besides the conveying unit, idler replacement devices, which are displaceable and are each provided with a lifting apparatus, are known, for example, from the publications DD 38 147 A1 and DE 3 42 000 A1. These auxiliary devices are conveyed to the idler station in question, then stopped there and brought into position. The idlers or idler garlands in question are then replaced. For this, a sufficient free space is needed next to and above the belt conveyor.

A vehicle equipped with a lifting means, which is displaceable next to a belt conveyor over its entire length, is known from the publication DE 7 238 731 U. It is equipped with a telescopic extension arm, which accommodates a belt carrier in the horizontal position. This belt carrier is equipped with two auxiliary idlers, which can be adapted in their slope to the trough of the belt. The belt carrier is guided under the belt for lifting the belt from the side opposite the vehicle and lifted to the extent that a sufficiently large free space forms for replacing the idlers lying under it. Due to the auxiliary idlers arranged on the belt carrier, the belt conveyor does not need to be stopped here. The worn idlers may now be replaced. Provided that the work safety regulations applicable for the respective belt conveyor permit, this may also happen during an operation in process. After the replacing, the belt is lowered again and the conveying operation may take place in the manner intended. Sufficient space is needed on both sides of the belt conveyor for the use of this auxiliary device for lifting the belt and replacing the idlers.

A device displaceable on the conveying unit for replacing idlers in the upper run is known from the publication DD 287 919 A5. It consists of a frame equipped with running wheels as a replacing device, which is displaceable under the idlers to be replaced along the supporting structure on both sides. The drive takes place by means of a cable line. Because of the cable line drive, such a solution is suitable for shorter conveying sections, as they are known, for example, from belt bridges or from driving and tensioning stations. It cannot be used in conveyor units that consist of individual sections not mechanically connected with one another.

An idler replacing device for shiftable conveyor belt units is known from the publication DD 229 662 A1. It encloses the conveyor unit in a gate-like manner and is displaceable on the shifting tracks that are present. The idler replacing device is provided with its own drive, by means of which the device is conveyed to the idler station with worn or damaged idlers. In the lifted state of the conveyor belt, the idlers located under it can be replaced. The removed damaged idlers are placed into a magazine arranged on the side of the device, in which new idlers to be replaced are also stored and kept ready. Sufficient space must be present for this magazine next to the conveyor unit over the entire length of use.

SUMMARY OF THE INVENTION

The basic object of the present invention is to develop a service vehicle for replacing idlers in the upper run and in the lower run of a continuous belt conveyor unit with a rising or falling route, with which worn or damaged idlers can be removed and new idlers can be installed. In this case, the space requirement of the service vehicle next to and above the belt conveyor unit shall be minimized. Here, the field of application of the present invention is aimed at the replacement of such idlers, which can or may no longer be moved by maintenance personnel without additional auxiliary means because of their weight and their size.

According to the invention. a service vehicle for replacing idlers of a belt conveyor is provided. The service vehicle comprises a frame with a size to enclose the belt conveyor in a gate-like manner, a driven track running gear comprising four running wheels such that the service vehicle is displaceable on tracks via the running wheels that are parallel to the belt conveyor, a horizontal pivoting axis arranged at the frame, an adjusting element arranged at the frame and a platform accommodated by the frame. The platform is pivotable about a horizontal pivoting axis, whereby the pivoting axis of the platform and the adjusting element are arranged at the frame such that the platform can be brought into a horizontal position depending on the slope of the belt guide and on the position of the service vehicle connected therewith. A lifting apparatus and an idler garland are provided. The lifting apparatus and the idler garland are arranged at the service vehicle for replacing the idlers. A drive train is arranged next to the track. A drive element is in positive-locking active connection with the drive train, the drive element is arranged next to at least one of the running wheels.

According to the present invention, the service vehicle for replacing idlers of a belt conveyor encloses the conveying means closely from outside and is designed in the form of a gate. This type of construction permits the use of the service vehicle even in environments with spatially limited service areas, e.g., in tunnels. The use of a track running gear, which is guided in a narrow tolerance range on tracks arranged on both sides of the belt conveyor, advantageously supports this possible form of use. Due to its pivotability, the working platform can be maintained in a horizontal position, even if the slope of the service vehicle, following the topography of the terrain, changes.

The service vehicle has a lifting apparatus and an idler garland for supporting mounting operations.

Furthermore, the service vehicle has a positive-locking drive. A chain strand is preferably arranged next to the tracks for this. The chain strand is guided via two guide sprocket wheels and a driving chain wheel arranged between them, which are mounted on the frame of the service vehicle. The service vehicle is pulled along on the chain strands via these positive-locking omega chain drives. A slipping of the service vehicle is advantageously ruled out due to the positive-locking connection even in steeper areas of the traveling and at the same time conveying route.

An idler garland is preferably used for lifting the belt in the upper run and in the lower run during the replacement of idlers. The idler garland consists of a wire cable, which rotatably picks up idlers that are arranged at defined distances to one another. By lifting the idler garland by means of an adjusting means mounted on the frame (winch or hydraulic cylinder), the belt located above the idler garland is lifted. This lifting takes place until sufficient free space is present for replacing worn idlers with new idlers.

After the replacement of the idlers, this idler garland is preferably first lowered before displacement of the service vehicle and then removed from the belt and from the frame field.

In a preferred embodiment, the rectangular platform is horizontally pivotably mounted on one side of the frame and can be raised or lowered on the other side by means of an adjusting means (hydraulic cylinder). The adjusting of the platform into the horizontal position, in case of a sloped position of the service vehicle, can take place either manually by the operating personnel or automatically by means of a control means.

In a further preferred embodiment, the lifting apparatus consists of a mount arranged permanently on the platform and an extension arm. This extension arm is pivotable in the horizontal and the vertical directions; moreover, it can be extended and retracted in the longitudinal direction. A crane hook, which can accommodate specially developed devices for replacing the idlers, is mounted at its end.

The present invention is explained in detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
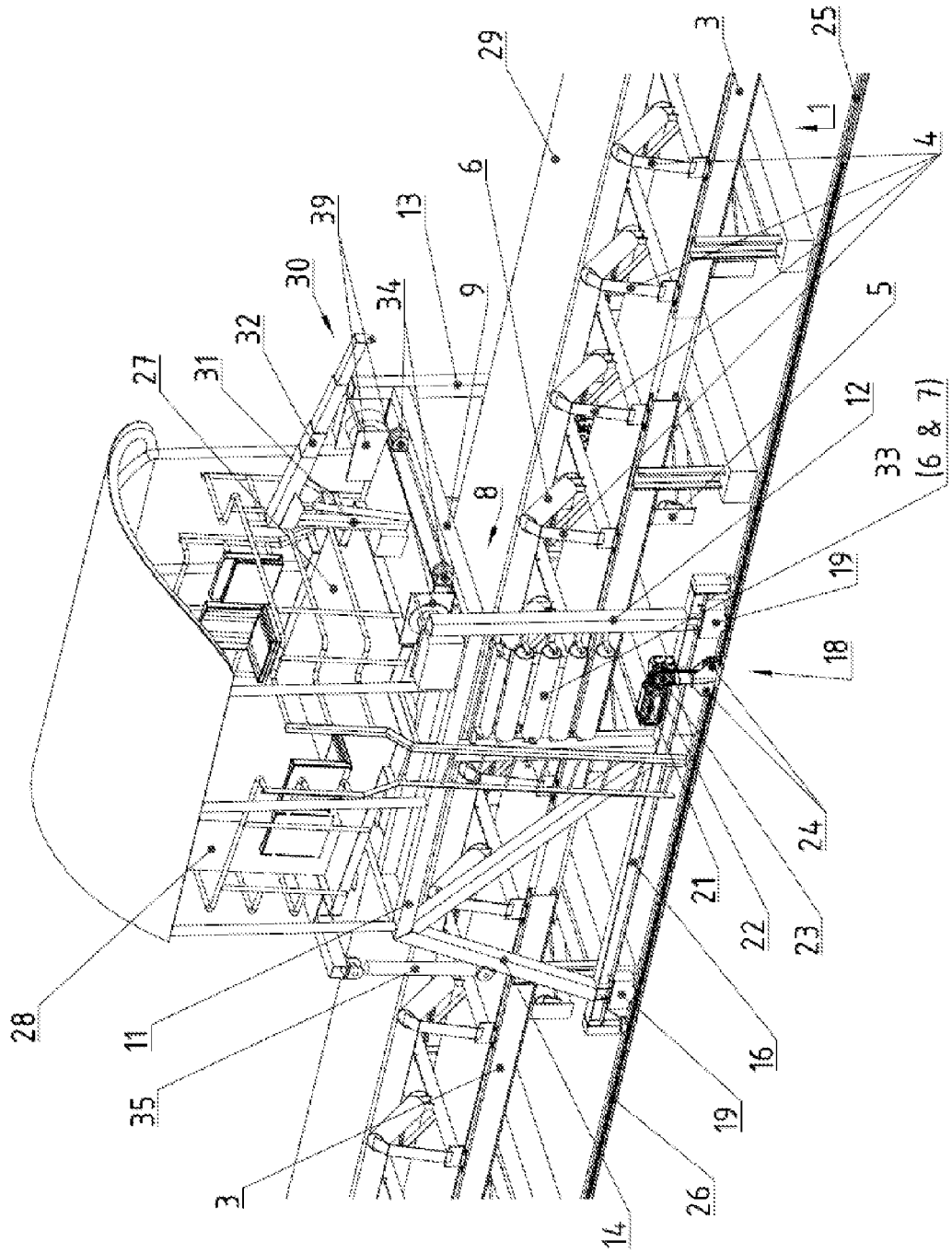
FIG. 1 is a perspective view showing the overall view of a service vehicle according to the present invention.
Figure 2:
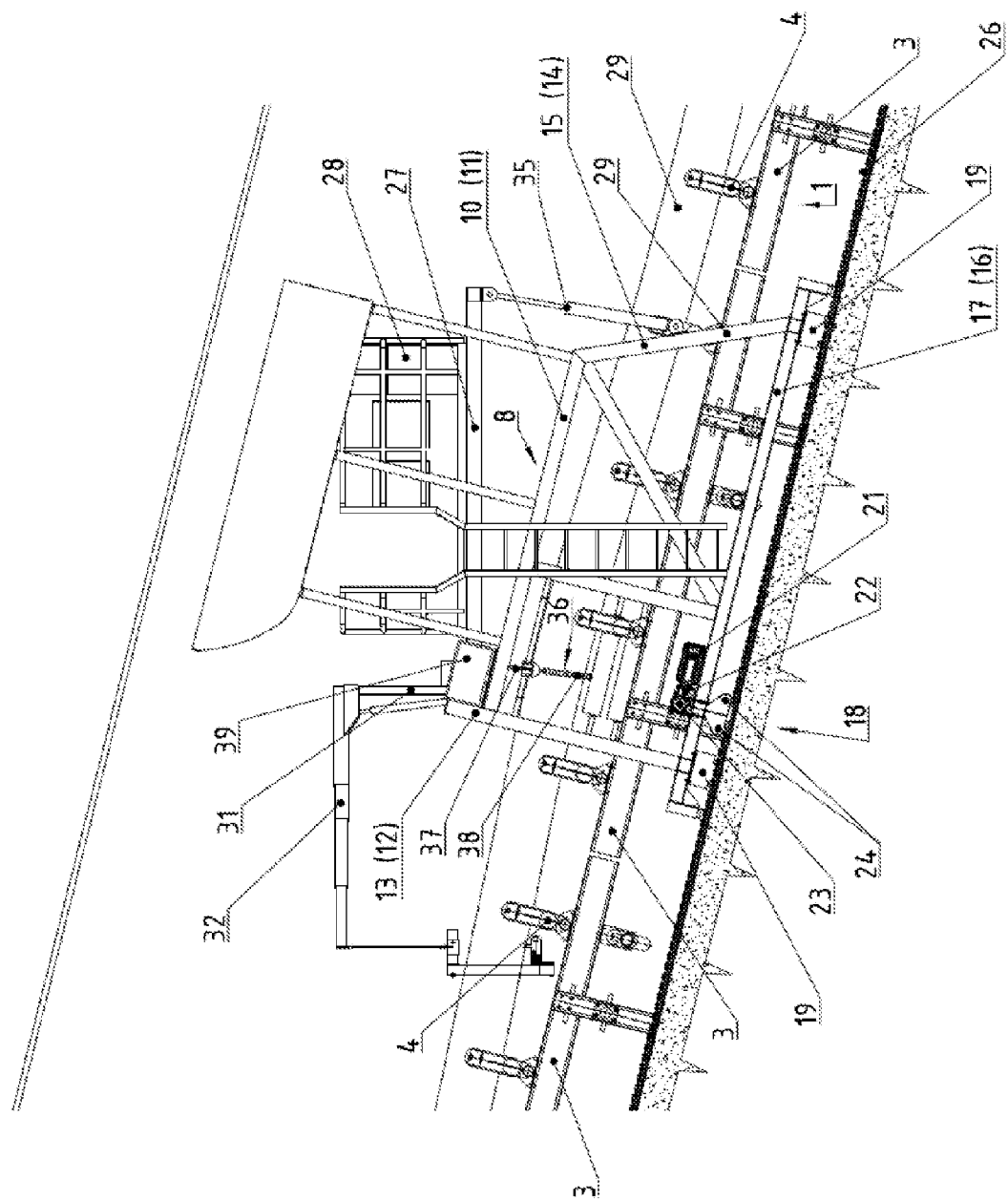
FIG. 2 is a side view showing the service vehicle.

Referring to the drawings in particular, FIGS. 1 and 2 show a belt conveyor 1, which has a sloping conveying route. This conveying route may run constantly or irregularly in a horizontal, rising and/or falling direction over its entire length. The drawings show a rising conveying route as an example. The frame 2 of the belt conveyor 1 is composed of a plurality of frame segments 3 arranged in a row one behind the other. Each of these frame segments 3 accommodates idler stations 4, 5 for the upper run and the lower run of the belt conveyor 1. In the exemplary embodiment, each frame segment 3 is equipped with four idler stations 4 in the upper run and two idler stations 5 in the lower run. According to FIG. 3, each of the idler stations 4 in the upper run consists of three idlers 6 arranged in a trough-shaped manner to each other and the idler station 5 in the lower run consists of two idlers 7 arranged in a V-shaped manner to each other.

Figure 3:
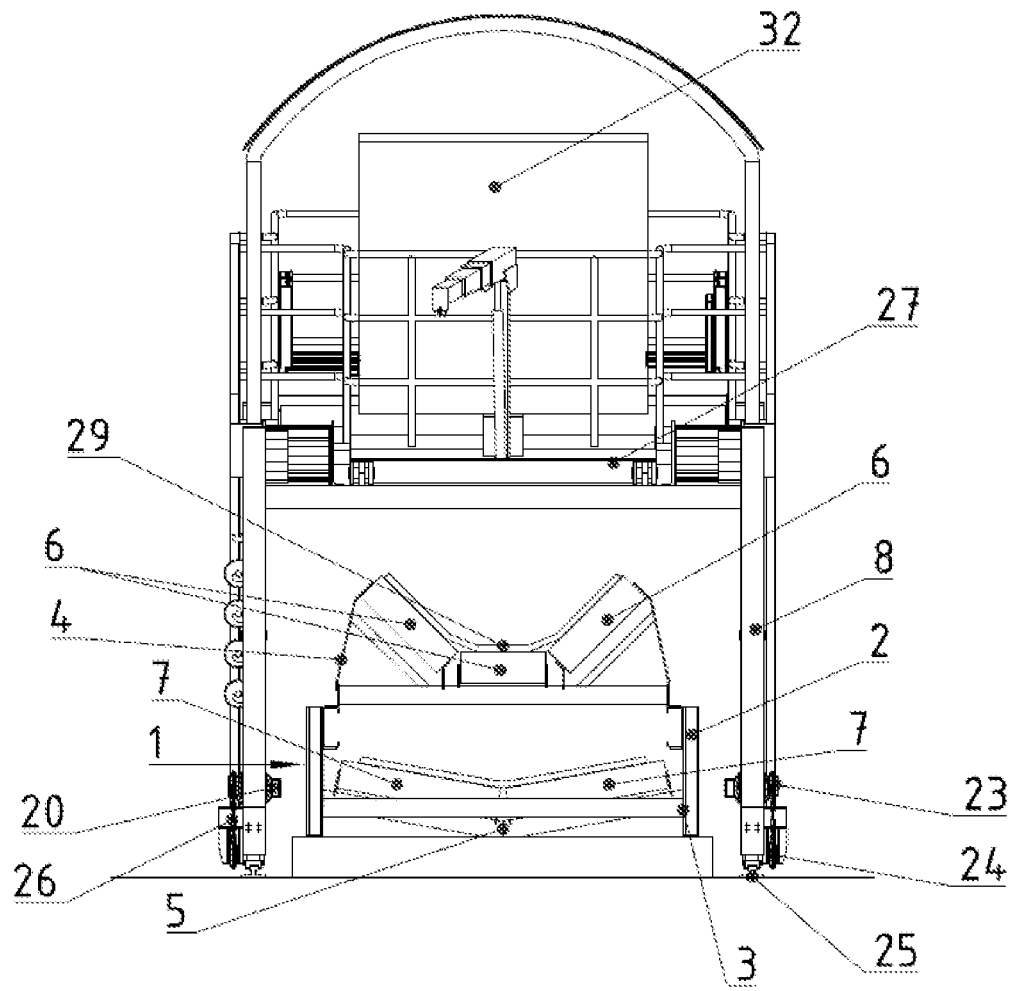
FIG. 3 is a front view showing the service vehicle.

The service vehicle shown in FIGS. 1 through 3 consists of a frame 8, which encloses the belt conveyor 1 as a gate and in the top view consists of three carriers 9, 10, 11 arranged in a u-shaped manner to each other, whereby one carrier is directed as a crossbeam 9 parallel to the axis of the lower idler 6 of the idler stations 4 in the upper run and two longitudinal members 10, 11 are fastened on the outside on both sides at this crossbeam 9 at right angles thereto. Two supports 12 through 15 are each located at both ends of these longitudinal members 10, 11. Always two of these supports 12, 13 and 14, 15, which are arranged on one side of the belt conveyor 1, are connected with one another for achieving a sufficient stiffness at their lower ends by means of a longitudinal member 16, 17. The service vehicle is equipped with a track running gear 18. This track running gear 18 consists of four running wheels 19 of identical design, of which one running wheel 19 is mounted under a support 12 through 15 each. Each of the two lower longitudinal members 16, 17 of the vehicle frame 8 accommodates a drive 20, each of which consists of a motor 21 with downstream gear mechanism 22 as well as the driving chain wheel 23 and two guide sprocket wheels 24 (omega drive). On both sides of the belt conveyor 1 are arranged tracks 25 running in the conveying direction and chain strands 26. The service vehicle with its running wheels 19 is displaceable on these tracks 25. The driving torque is transmitted by the motor 21 via the gear mechanism 22 to the driving chain wheel 23, such that the service vehicle is pulled along by means of the positive-locking connection at the chain strand 26.

A platform 27 is located on the frame 8 of the service vehicle. This platform 27 accommodates a tool cabinet 28 as well as an operating terminal, not shown in the drawings, and is provided for the stop of the maintenance personnel during the travel of the service vehicle and partly during the replacement of the idlers 6, 7. A lifting apparatus 30 is arranged in the middle above the belt 29 at the platform 27. This lifting apparatus 30 is equipped with a crane hook and consists of a column 31, which picks up above an extension arm 32 which is horizontal in the starting position. This extension arm 32 is variable (telescopic) in its length, adjustable in its slope deviating from the horizontal and pivotable toward the permanently arranged column 31. With this lifting apparatus 30, the service personnel is able to replace defective or worn idlers 6, 7 with a special load pick-up means. Such load pick-up means are known, for example, from patent application DE 10 2013 205 041 with the title: "Method and device for replacing idlers of a belt conveyor." A magazine 33 with new idlers 6, 7 is located in the active area of the lifting apparatus 30. The size of this magazine 33 is dimensioned according to the number of maximum idlers 6, 7 to be replaced. After removal of the new idlers 6, 7, the magazine 33 is used for accommodating the old idlers 6, 7. No distinction is made in the drawing between old, worn and new idlers 6, 7, since this is immaterial in the situation shown.

Furthermore, storage possibilities are also provided for the load pick-up means for replacement of the idlers 6, 7.

In order to create optimal conditions for the service personnel located on the platform 27 during the replacement of the idlers 6, 7, the platform 27 is arranged in a pivotable manner. For this purpose, it is mounted horizontally on one side in its pivoting axis 34. On the opposite side, the platform 27 can be adjusted vertically by means of two hydraulic cylinders 35.

Consequently, the platform 27 can be brought into the horizontal position to guarantee the work safety of the service personnel.

An idler garland 36 is used for lifting the belt 29 in the upper run and lower run during replacement of idlers 6. It consists of a wire cable 37, which picks up idlers 38 arranged at distances to each other in a rotatable manner. The belt 29 is lifted when the wire cable 37 is raised on both sides by means of an adjusting mechanism designed as a winch or hydraulic cylinder. This lifting takes place to a height that the worn idler 6 can be replaced with a new idler 6. This idler garland 36 must be removed from the belt frame 2 during a displacement of the service vehicle along the belt conveyor 1.

While specific embodiments of the invention have been shown and described in detail to illustrate the application of the principles of the invention, it will be understood that the invention may be embodied otherwise without departing from such principles.

APPENDIX

List of Reference Numbers:

| | |
|---|---|
| 1 | Belt conveyor |
| 2 | Frame (of the belt conveyor) |
| 3 | Frame segment |
| 4 | Idler station (upper run) |
| 5 | Idler station (lower run) |
| 6 | Idler (upper run) |
| 7 | Idler (lower run) |
| 8 | Frame, consisting of |
| 9 | Crossbeam |
| 10 | Longitudinal member |
| 11 | Longitudinal member |
| 12 | Support |
| 13 | Support |
| 14 | Support |
| 15 | Support |
| 16 | Longitudinal member |
| 17 | Longitudinal member |
| 18 | Track running gear, consisting of |
| 19 | Running wheel |
| 20 | Drive, consisting of |
| 21 | Motor |
| 22 | Gear mechanism |
| 23 | Driving chain wheel |
| 24 | Guide sprocket wheel |
| 25 | Track |
| 26 | Chain strand |
| 27 | Platform |
| 28 | Tool cabinet |
| 29 | Belt |
| 30 | Lifting apparatus, consisting of |
| 31 | Column |
| 32 | Extension arm |
| 33 | (Idler) magazine |

APPENDIX-continued

List of Reference Numbers:

| | |
|---|---|
| 34 | Pivoting axis |
| 35 | Hydraulic cylinder/actuating element |
| 36 | Idler garland for lifting the belt 29, consisting of |
| 37 | Wire cable |
| 38 | Roller |
| 39 | Winch/Actuating element |

What is claimed is:

1. A service vehicle for replacing idlers of a belt conveyor, the service vehicle comprising:
   a frame with a size to enclose the belt conveyor in a gate-like manner;
   a driven track running gear comprising four running wheels, the service vehicle being displaceable on tracks via the running wheels that are parallel to the belt conveyor;
   a horizontal pivoting axis arranged at the frame;
   an adjusting element arranged at the frame;
   a platform accommodated by the frame, the platform being pivotable about a horizontal pivoting axis, whereby the pivoting axis of the platform and the adjusting element are arranged at the frame such that the platform can be brought into a horizontal position depending on the slope of the belt guide and on the position of the service vehicle connected therewith;
   a lifting apparatus;
   an idler garland, the lifting apparatus and the idler garland being arranged at the service vehicle for replacing the idlers;
   a drive train arranged next to the track; and
   a drive element in positive-locking active connection with a drive train, the drive element is arranged next to at least one of the running wheels.

2. A service vehicle for replacing idlers in accordance with claim 1, further comprising adjusting elements arranged on both sides of the frame wherein the idler garland is vertically adjustable by means of the adjusting elements.

3. A service vehicle for replacing idlers in accordance with claim 2, wherein the adjusting elements comprise at least one of winches and hydraulic cylinders.

4. A service vehicle for replacing idlers in accordance with claim 2, wherein the idler garland can be separated from the belt by unhinging.

5. A service vehicle for replacing idlers in accordance with claim 1, wherein the idler garland can be separated from the belt by unhinging.

6. Service vehicle for replacing idlers in accordance with claim 1, wherein the lifting apparatus comprises:
   a column fastened to the platform; and
   an extension arm that is pivotable as well as telescopic in the horizontal and vertical directions, wherein an end of this extension arm has means for accommodating specifically designed load pick-up devices for replacing the idlers.

* * * * *